(12) United States Patent
Yamada et al.

(10) Patent No.: US 8,680,169 B2
(45) Date of Patent: Mar. 25, 2014

(54) POROUS POLYPROPYLENE FILM

(75) Inventors: Takeyoshi Yamada, Shiga (JP); Yasushi Usami, Shiga (JP); Toru Terakawa, Shiga (JP)

(73) Assignee: Mitsubishi Plastics, Inc., Tokyo (JP)

(*) Notice: Subject to any disclaimer, the term of this patent is extended or adjusted under 35 U.S.C. 154(b) by 0 days.

(21) Appl. No.: 13/378,107

(22) PCT Filed: Jun. 16, 2010

(86) PCT No.: PCT/JP2010/060213
§ 371 (c)(1),
(2), (4) Date: Dec. 14, 2011

(87) PCT Pub. No.: WO2010/147149
PCT Pub. Date: Dec. 23, 2010

(65) Prior Publication Data
US 2012/0101180 A1    Apr. 26, 2012

(30) Foreign Application Priority Data
Jun. 19, 2009   (JP) .................. 2009-146167

(51) Int. Cl.
*C08F 10/06*   (2006.01)

(52) U.S. Cl.
USPC ........ 521/143; 429/246; 264/210.1; 264/46.1

(58) Field of Classification Search
USPC ........................................................ 521/143
See application file for complete search history.

(56) References Cited

U.S. PATENT DOCUMENTS

| | | | |
|---|---|---|---|
| 7,727,620 B2 | 6/2010 | Yamada et al. | |
| 2004/0197540 A1* | 10/2004 | Davidson et al. | 428/304.4 |
| 2007/0178324 A1 | 8/2007 | Masuda et al. | |
| 2009/0263600 A1 | 10/2009 | Miyashita et al. | |
| 2010/0021822 A1* | 1/2010 | Ikemoto et al. | 429/247 |
| 2010/0151311 A1 | 6/2010 | Usami et al. | |
| 2011/0159346 A1 | 6/2011 | Yamamoto et al. | |
| 2011/0212358 A1 | 9/2011 | Usami et al. | |
| 2011/0217584 A1 | 9/2011 | Terakawa et al. | |
| 2011/0300430 A1 | 12/2011 | Usami et al. | |

FOREIGN PATENT DOCUMENTS

| | | |
|---|---|---|
| JP | 8 1845 | 1/1996 |
| JP | 3443934 | 6/2003 |
| JP | 3508515 | 1/2004 |
| JP | 2005171230 | * 6/2005 |
| JP | 2007 3975 | 1/2007 |
| JP | 2008 120931 | 5/2008 |
| JP | 2010 111096 | 5/2010 |
| WO | 02 066233 | 8/2002 |
| WO | 2005 103127 | 11/2005 |
| WO | 2007 046225 | 4/2007 |

OTHER PUBLICATIONS

Plastics Design Library. "Fatigue and Tribological Properties of Plastics and Elastomers". 1995. William Andrew Publishing. Table: Friction Coefficient; Wear Factor.*
Lupke, Th.; Dunger, S.; Sanze, J.; Radusch, H.-J. "Sequential biaxial drawing of propylene films". Polymer 45 (2004) pp. 6861-6872. Available online Aug. 24, 2004.*
Truncyte, D.; Gutauskas, M.; Zebrauskas, S.; Virbalis, J. "Triboelectricity in the Pairs of Polymeric Materials" Journal of Applied Polymer Science, vol. 110, pp. 3532-3537. Published online Sep. 15, 2008.*
Plastics Technology. "Additives for polyolefins: Newest advances add ruggedness, good looks & easier processing". Issue: Jul. 2005. Accessed online Nov. 8, 2012 at www.ptonline.com/articles.*
Jacoby, P. "Using beta nucleation to improve the thermoforming characteristics of polypropylene" Plastics Engineering. Jul. 2012. Accessed at http://www.thefreelibrary.com/Using+beta+nucleation+to+improve+the+thermoforming+characteristics+of . . . -a0300443836.*
International Search Report Issued Jul. 20, 2010 in PCT/JP10/60213 Filed Jun. 16, 2010.
U.S. Appl. No. 13/635,506, filed Sep. 17, 2012, Yamada, et al.
U.S. Appl. No. 13/635,764, filed Sep. 18, 2012, Yamamoto, et al.
U.S. Appl. No. 13/582,659, filed Sep. 4, 2012, Yamamoto, et al.

* cited by examiner

*Primary Examiner* — Randy Gulakowski
*Assistant Examiner* — Christina Wales
(74) *Attorney, Agent, or Firm* — Oblon, Spivak, McClelland, Maier & Neustadt, L.L.P.

(57) ABSTRACT

Provided is a porous polypropylene film having both air permeability properties and puncture strength. A porous polypropylene film which has an air permeability of 700 seconds/100 ml or less and a puncture strength of 1.5 N or greater, and has β activity can be obtained when the porous polypropylene film is made to have a tensile strength in the machine direction of the film, $E_{MD}$, of 100 MPa or greater, a tensile strength in the transverse direction to the machine direction, $E_{TD}$, of less than 100 MPa, and a ratio of $E_{MD}$ and $E_{TD}$, $E_{MD}/E_{TD}$, of 1.5 to 10.

11 Claims, No Drawings

POROUS POLYPROPYLENE FILM

TECHNICAL FIELD

The present invention relates to a porous film, which can be used as a packaging article, a sanitary article, a dairy article, an agricultural article, a construction article, a medical article, a separator membrane, a light diffuser plate, or a separator for batteries, and which is particularly related to a separator for lithium ion batteries.

BACKGROUND ART

High molecular porous films having large numbers of fine continuous pores are being used in various applications such as a separator membrane that is used in the production of ultrapure water, purification of drug liquids, water treatment, and the like; a waterproof, moisture-permeable film that is used in the clothing, sanitary materials, and the like; and a battery separator used in batteries or the like. As a method for producing such a porous film, there is known a method of melt mixing polypropylene with inorganic filler such as calcium carbonate or barium sulfate, forming a film from the mixture, and then subjecting the film to stretching and porosification. However, the porous film obtainable by this method gives rise to areas of dispersion failure due to the low compatibility of inorganic fillers with polyolefin, and thus has a problem that pinholes are likely to occur during the process of stretching and porosification, or that the inorganic filler comes off during the production or during use, contaminating the process. As another production method, there has been suggested a method of heat dissolving liquid paraffin or the like in ultra-high molecular weight polyethylene or the like to obtain a gel-like sheet, subjecting the gel-like sheet to a solvent removal treatment before and after stretching, and thereby obtaining a porous film. However, since the production method for the film includes solvent removal steps, there are problems that the production process is complicated, and that the high temperature heat resistance is insufficient because a polyethylene resin having a low melting point is used as a main component.

Furthermore, various methods for stretching a polypropylene sheet containing β crystals have also been suggested. For example, Japanese Patent No. 3443934 (Patent Document 1) suggests a porous film which is obtainable by stretching a β crystal-containing polypropylene sheet containing an amide compound. Furthermore, PCT International Patent Application WO 2002/066233 (Patent Document 2) describes a method for producing a porous film made of polypropylene by sequentially biaxially stretching a polypropylene sheet containing needle-like β crystals.

In regard to the method for producing a porous film using β crystal polypropylene, which is represented by the publications described above, a method of increasing the longitudinal stretch ratio (hereinafter, referred to as "MD stretch ratio") and the transverse stretch ratio (hereinafter, referred to as "TD stretch ratio") has been generally employed for the purpose of increasing pores in the film and thereby enhancing the air permeability properties. Furthermore, from the viewpoint of placing emphasis on the isotropy of the resulting film, it has been considered as common knowledge for those having ordinary skill in the art, that it is preferable to set the stretch ratios in the two directions to be almost equal. That is, in regard to the formation of a porous film using β crystal polypropylene, it has been considered preferable to stretch the film isotropically in the longitudinal direction and in the transverse direction at a high ratio. A film obtained by this method has satisfactory permeability characteristics because of the high porosity, and acquires a tensile strength which is isotropic in the longitudinal direction and the transverse direction of the film.

Furthermore, with regard to a porous polypropylene film using β crystals, an investigation has been conducted to improve handleability by enhancing the film surface sliding property by means of the surface unevenness generated at the time of stretching, as disclosed in Japanese Patent No. 3508515 (Patent Document 3).

Patent Document 1: Japanese Patent No. 3443934
Patent Document 2: WO 2002/066233
Patent Document 3: Japanese Patent No. 3508515

DISCLOSURE OF INVENTION

Problem to be Solved by the Invention

However, since a porous film obtained by the production method described in Patent Document 1 or 2 has a high porosity, the puncture strength in the film plane direction (the film rupture strength determined when a pin pierces the film in the direction perpendicular to the film plane) is low, and the porous film also has a problem that the tensile strength in the longitudinal direction (rigidity) is likely to be insufficient, and the handleability in the film conveying step and the like is deteriorated. For example, in the case of using the porous film as a separator for batteries, when winding of the film is carried out during the film conveyance or during the battery assembling step, the film undergoes elongation even if only slight tension is applied. Therefore, it has been difficult to handle the porous film.

Also, when a porous film is subjected to high ratio stretching in the transverse direction as described in Patent Document 3, the surface unevenness protruded as a result of longitudinal stretching is flattened, so that the sliding property of the resulting stretched film surface is prone to deteriorate. Therefore, there have been problems with the handleability of the film, such that at the time of conveying or winding the film in the actual processes, for example, the sliding property between the film conveying rolls or between the films is poor, and even only slight tension causes wrinkling.

Means for Solving Problem

The inventors of the present invention conducted a thorough investigation, and as a result, the inventors found that such problems can be addressed by obtaining a porous polypropylene film which has a tensile strength in the machine direction (MD) of the film, $E_{MD}$, of 100 MPa or greater, a tensile strength in the transverse direction to the machine direction (TD), $E_{TD}$, of less than 100 MPa, a ratio between $E_{MD}$ and $E_{TD}$, $E_{MD}/E_{TD}$, of 1.5 to 10, an air permeability of 700 seconds/100 ml or less, and a puncture strength of 1.5 N or greater, and has β activity.

Furthermore, it is preferable for the porous polypropylene film that the coefficient of dynamic friction at the front and back surfaces of the film be 0.10 to 0.80.

Also, the porous polypropylene film can be obtained under the stretching conditions that the stretch ratio in the machine direction, $\lambda_{MD}$, is 3.0 to 8.0 times, the stretch ratio in the transverse direction to the machine direction, $\lambda_{TD}$, is 1.1 to 3.0 times, and the ratio of $\lambda_{MD}$ and $\lambda_{TD}$, $\lambda_{MD}/\lambda_{TD}$, is 1.5 to 5.0.

Effect of the Invention

The porous polypropylene film of the present invention exhibits a high mechanical strength in the machine direction of the film, and a film capable of achieving an excellent balance between the air permeability properties and the puncture strength as compared with conventional porous films can be obtained.

BEST MODE(S) FOR CARRYING OUT THE INVENTION

Hereinafter, embodiments of the porous polypropylene film of the present invention will be described in detail.

In the present invention, the expression "main component" includes, unless particularly stated otherwise, the meaning that it is acceptable for the porous polypropylene film to contain other components to the extent that the function of the relevant main component is not interrupted. Particularly, it is not intended to specify the content ratio of the relevant main component, but the expression "main component" includes the meaning that the proportion of the main component occupies 50% by mass or more, preferably 70% by mass or more, and particularly preferably 90% by mass or more (including 100%).

Furthermore, the term "X to Y" (X and Y are arbitrary numbers) includes, unless particularly stated otherwise, the meaning that "equal to or more than X and equal to or less than Y", as well as the meaning that "preferably more than X" and "preferably less than Y".

The porous polypropylene film of the present invention has an important feature of having the β activity described above.

The β activity can be understood as an index showing that the polypropylene series resin has produced β crystals in a film-like object prior to stretching. When the polypropylene series resin in a film-like object prior to stretching produces β crystals, even in the case where additives such as a filler are not used, fine pores are easily formed by subjecting the polypropylene series resin to stretching. Therefore, a porous polypropylene film having air permeability properties can be obtained.

In regard to the porous polypropylene film of the present invention, the presence or absence of the "β activity" is determined such that when a crystal melting peak temperature originating from β crystals is detected by the differential scanning calorimeter that will be described below, and/or when a diffraction peak originating from β crystals is detected by a measurement using the X-ray diffraction apparatus that will be described below, the porous polypropylene film has the "β activity".

Specifically, when a porous polypropylene film is heated from 25° C. to 240° C. at a heating rate of 10° C./min with a differential scanning calorimeter and then maintained for one minute, subsequently the film is cooled from 240° C. to 25° C. at a cooling rate of 10° C./min and then maintained for one minute, and the film is reheated from 25° C. to 240° C. at a heating rate of 10° C./min, if a crystal melting peak temperature originating from the β crystals of the polypropylene series resin (Tmβ) is detected, it is determined that the porous polypropylene film has the β activity.

Furthermore, the degree of β activity of the porous polypropylene film is calculated using the detected heat of crystal melting originating from α crystals (ΔHmα) and the detected heat of crystal melting originating from β crystals (ΔHmβ) of the polypropylene series resin, based on the following formula:

Degree of β activity(%)=[ΔHmβ/(ΔHmβ+ΔHmα)]×100

For example, when the polypropylene series resin is a homopolypropylene, the degree of β activity can be calculated from the heat of crystal melting originating from β crystals (ΔHmβ) which is mainly detected in the range of equal to or higher than 145° C. and lower than 160° C., and the heat of crystal melting originating from α crystals (ΔHmα) which is mainly detected in the range of equal to or higher than 160° C. and equal to or lower than 170° C. Also, for example, in the case of a random polypropylene in which ethylene is copolymerized at a proportion of 1 mol % to 4 mol %, the degree of β activity can be calculated from the heat of crystal melting originating from β crystals (ΔHmβ) which is mainly detected in the range of equal to or higher than 120° C. and lower than 140° C., and the heat of crystal melting originating from α crystals (ΔHmα) which is mainly detected in the range of equal to or higher than 140° C. and equal to or lower than 165° C.

The degree of β activity of the porous polypropylene film is such that a larger value is more preferable, and the degree of β activity is preferably 20% or greater. The degree of β activity is more preferably 40% or greater, and particularly preferably 60% or greater. When the porous polypropylene film has a degree of β activity of 20% or greater, it implies that β crystals of the polypropylene series resin can be produced in a large amount even in a film-like object prior to stretching, and a large number of fine, uniform pores are formed by stretching. As a result, the porous polypropylene film can be used as a separator for lithium ion lithium batteries, having a high mechanical strength and excellent air permeability performance.

The upper limit of the degree of β activity is not particularly limited, but as the degree of β activity is higher, the effect described above can be obtained more effectively. Therefore, a value close to 100% is preferable.

Furthermore, the presence or absence of the β activity can also be determined from the diffraction profile which is obtained by a wide angle X-ray diffraction analysis of a porous polypropylene film that has been subjected to a specific heat treatment.

More specifically, a wide angle X-ray analysis is carried out on a porous polypropylene film in which β crystals are produced and grown by subjecting the porous polypropylene film to a heat treatment at a temperature of 170° C. to 190° C., which is a temperature exceeding the melting point of polypropylene series resins, and to slow cooling. When a diffraction peak which originates from the (300) plane of the β crystal of a polypropylene series resin is detected in the range of 2θ=16.0° to 16.5°, it is determined that the porous polypropylene film has β activity.

The details of the β crystal structure of polypropylene series resins and the wide angle X-ray diffraction can be found in Macromol. Chem., 187, 643-652 (1986), Prog. Polym. Sci., vol. 16, 361-404 (1991), Macromol. Symp., 89, 499-511 (1995), Macromol. Chem., 75, 134 (1964), and the reference documents mentioned in these documents. The details of the method for evaluation of the β activity using wide angle x-ray diffraction will be described in the following Examples.

The β activity can be measured in the state of the entire layer of the porous film, whether the porous polypropylene film of the present invention has a single layer structure, or another porous layer is laminated thereon.

Furthermore, if a layer containing a polypropylene series resin or the like is laminated in addition to the layer formed of a polypropylene series resin, it is preferable that both of the layers have the β activity.

Examples of a method of acquiring the β activity as described above include a method of adding a polypropylene which has been subjected to a treatment for generating peroxide radicals as described in Japanese Patent No. 3739481, and a method of adding a β crystal nucleating agent to the composition.

According to the present invention, it is preferable to add a β crystal nucleating agent to the polypropylene series resin, because the polypropylene series resin can have higher β activity. The proportion of the β crystal nucleating agent to be added to the polypropylene series resin needs to be appropriately adjusted depending on the type of the β crystal nucleating agent, the composition of the polypropylene series resin or the like, but it is preferable to use 0.0001 to 5.0 parts by mass of the β crystal nucleating agent relative to 100 parts by mass of the polypropylene series resin. The proportion of the β crystal nucleating agent is more preferably 0.001 to 3.0 parts by mass, and even more preferably 0.01 to 1.0 parts by mass. When the proportion is 0.0001 parts by mass or more, the β crystals of the polypropylene series resin can be sufficiently produced and grown during production, and when the polypropylene series resin film is used as a separator, sufficient β activity can be secured, while a desired air permeability performance is obtained. Furthermore, when the β crystal nucleating agent is added in an amount of 5.0 parts by mass or less, it is economically advantageous, and bleeding of the β crystal nucleating agent or the like at the surface of the porous polypropylene film does not occur, which is preferable.

Furthermore, if a layer containing a polypropylene series resin, or the like is laminated in addition to the layer formed of a polypropylene series resin, the amounts of addition of the β crystal nucleating agent in the respective layers may be identical with or different from each other. The porous structure of each of the layers can be appropriately adjusted by varying the additive amount of the β crystal nucleating agent.

The various components constituting the porous polypropylene film of the present invention will be described below.

[Description on Polypropylene Series Resin]

Examples of the polypropylene series resin include homopropylene (propylene homopolymer), and random copolymers or block copolymers of propylene with α-olefins such as ethylene, 1-butene, 1-pentene, 1-hexene, 1-heptene, 1-octene, 1-nonene and 1-decene. Among these, homopolypropylene is more suitably used from the viewpoint of maintaining the level of the degree of β activity, or the mechanical strength, heat resistance and the like of the porous polypropylene film.

For the polypropylene series resin, the isotactic pentad fraction (mmmm fraction) exhibiting stereoregularity is preferably 80% to 99%. More preferably, a polypropylene series resin having an isotactic pentad fraction of 83% to 98%, and even more preferably 85% to 97% is used. If the isotactic pentad fraction is too low, there is a risk that the mechanical strength of the film may be decreased. On the other hand, the upper limit of the isotactic pentad fraction is defined as the upper limit value which is industrially obtainable at the present, but an exemption will be made if a resin having higher stereoregularity at the industrial level is developed in the future.

The isotactic pentad fraction (mmmm fraction) means a configuration having a main chain composed of any five successive propylene units that are linked via a carbon-carbon bond, in which five methyl groups constituting side chains are all positioned in the same direction, or a fraction of the configuration. The assignment of the signals for the methyl group region was implemented according to A. Zambellietal (Macromolecules, 8, 687 (1975)).

Furthermore, in regard to the polypropylene series resin, the ratio Mw/Mn, a parameter representing the molecular weight distribution, is preferably 2.0 to 10.0. More preferably, a polypropylene series resin having an Mw/Mn value of 2.0 to 8.0, and even more preferably 2.0 to 6.0, is used. A smaller value of the ratio Mw/Mn means a narrower molecular weight distribution, but if the ratio Mw/Mn is less than 2.0, there occurs a problem of decreased extrusion moldability, and also, production of the polypropylene in an industrial scale is difficult. On the other hand, if the ratio Mw/Mn is greater than 10.0, the proportion of low molecular weight components is increased, and the mechanical strength of the porous polypropylene film is likely to be decreased. The ratio Mw/Mn is obtained according to a GPC (gel permeation chromatography) method.

Furthermore, there are no particular limitations on the melt flow rate (MFR) of the polypropylene series resin, but usually, the MFR is preferably 0.5 to 15 g/10 min, and more preferably 1.0 to 10 g/10 min. If the MFR is less than 0.5 g/10 min, the melt viscosity of the resin at the time of molding processing is high, and productivity is decreased. On the other hand, if the MFR exceeds 15 g/10 min, the mechanical strength of the resulting porous polypropylene film is insufficient, and therefore, a problem in practical use may easily occur. The MFR is measured according to JIS K7210, under the conditions of a temperature of 230° C. under a load of 2.16 kg.

The method for producing the polypropylene series resin is not particularly limited, and any known polymerization method using a known catalyst for polymerization, for example, a polymerization method using a multi-site catalyst which is represented by a Zigler-Natta catalyst, or a single-site catalyst which is represented by a metallocene catalyst, and the like may be used.

As the polypropylene series resin, for example, commercially available products that are sold in the market, such as "NOVATEC PP", "WINTEC" (manufactured by Japan Polypropylene Corp.), "VERSIFY", "NOTIO" and "TAFMER XR" (manufactured by Mitsui Chemical Corp.), "ZELAS", "THERMOLAN" (manufactured by Mitsubishi Chemical Corp.), "SUMITOMO NOBLEN", "TAFTHELEN" (manufactured by Sumitomo Chemical Co., Ltd.), "PRIME TPO" (manufactured by Prime Polymer Co., Ltd.), "ADFLEX", "ADSYL", "HMS-PP (PF814)" (manufactured by Sanaroma Corporation, Ltd.), and "INSPIRE" (manufactured by Dow Chemical Company) can be used.

[Description on β Crystal Nucleating Agent]

Examples of the β crystal nucleating agent used in the present invention include the compounds described below. However, there are no particular limitations as long as the compound increases the production and growth of β crystals of a polypropylene series resin, and a mixture of two or more kinds may also be used.

Examples of the β crystal nucleating agent include amide compounds; tetraoxaspiro compounds; quinacridones; iron oxide having a nano-scale size; alkali or alkaline earth metal salts of carboxylic acids, represented by potassium 1,2-hydroxystearate, magnesium benzoate, magnesium succinate, magnesium phthalate or the like; aromatic sulfonic acid compounds represented by sodium benzenesulfonate or sodium naphthalenesulfonate; di- or triesters of dibasic or tribasic carboxylic acids; phthalocyanine series pigments represented by phthalocyanine blue; two-component-based compounds composed of an organic dibasic acid as component A and an oxide, hydroxide or a salt of a metal of Group IIA in the Periodic Table; and a composition composed of a cyclic phosphorus compound and a magnesium compound. Specific types of other nucleating agents are described in Japanese Patent Application Laid-Open (JP-A) No. 2003-306585, JP-A No. H06-289566, and JP-A No. H09-194650.

Commercially available products of the β crystal nucleating agent include "NJSTAR NU-100" manufactured by New Japan Chemical Co., Ltd., and specific examples of a polypropylene series resin containing an added β crystal nucleating agent include "BEPOL B-022SP", a polypropylene manufactured by Aristech, Inc.; "BETA (β)-PP BE60-7032", a polypropylene manufactured by Borealis AG"; and "BNX BETAPP-LN", a polypropylene manufactured by Mayzo, Inc.

[Description on Other Components]

According to the present invention, in addition to the components described above, additives that are generally incorporated into a resin composition can be appropriately added to the extent that the effects of the present invention are not markedly impaired. Examples of the additives include additives that are added for the purpose of improving and regulating the molding processability, productivity, and various properties of a porous polypropylene film, such as recycled resin that is generated from trimming loss, such as edges; inorganic particles such as silica, talc, kaolin and calcium carbonate; pigments such as titanium oxide and carbon black; a flame retardant, a weather-resistant stabilizer, a heat-resistant stabilizer, an antistatic agent, a melt viscosity improving agent, a crosslinking agent, a lubricating agent, a nucleating agent, a plasticizer, an age resistor, an oxidation inhibitor, a light stabilizer, an ultraviolet absorber, a neutralizing agent, an anti-fogging agent, an anti-blocking agent, a slip agent, and a colorant. Specifically, the oxidation inhibitors described in p. 154 to p. 158 of "Plastics Haigouzai (Additives for Plastics)"; the ultraviolet absorbers described in p. 178 to 182 of the same book; the surfactants as antistatic agents described in p. 271 to p. 275 of the same book; and the lubricating agents described in p. 283 to 294 of the same book.

[Description on Constitution of Porous Polypropylene Film]

The constitution of the porous polypropylene film of a first embodiment is not particularly limited as long as there is at least one layer containing a polypropylene series resin (hereinafter, referred to as "layer I"). Furthermore, another layer (hereinafter, referred to as "layer II") may also be laminated thereon to the extent that the function of the porous polypropylene film of the present invention is not impeded. There may be mentioned a constitution in which a strength retaining layer, a heat resistant layer (a high fusion temperature resin layer) or the like is laminated. For example, when the porous polypropylene film is used as a separator for lithium ion batteries, it is preferable to laminate a low melting point resin layer which clogs pores when the atmosphere turns into a high temperature atmosphere, and thereby secures safety of the battery as described in JP-A No. H04-181651.

Specific examples of the constitution include a two-layer structure obtained by laminating layer I/layer II, and a three-layer structure obtained by laminating layer I/layer II/layer I, or layer II/layer I/layer II. Furthermore, a form such as a three-kind three-layer structure which is in combination with another layer having a different function is also possible. In this case, the order of lamination with the layer having a different function is not particularly limited. Furthermore, the number of layers may be increased as necessary, to a four-layer structure, a five-layer structure, a six-layer structure or a seven-layer structure. When there are two or more layers containing a polypropylene series resin, the additives present in the respective layers may be identical or different.

[Description on Shape and Properties of Porous Polypropylene Film]

The shape of the porous polypropylene film of the first embodiment may be either planar or tubular, but from the viewpoint that productivity is good since several sheets as products can be grabbed together in the width direction, and treatments such as coating on the inner surface can be carried out, a planar shape is more preferred.

The thickness of the porous polypropylene film of the present invention is 1 to 500 µm, preferably 5 to 300 µm, and more preferably 7 to 100 µm. Particularly, when the porous polypropylene film is used as a separator for batteries, the thickness is preferably 1 to 50 µm, and more preferably 10 to 30 µm. In the case of using the porous polypropylene film as a separator for batteries, when the thickness is 1 µm or greater, and preferably 10 µm or greater, electrical insulating properties that are substantially necessary can be obtained. For example, even in the case where a large voltage is applied, short circuit does not easily occur, and excellent safety is obtained. Also, when the thickness is 50 µm or less, and preferably 30 µm or less, the electrical resistance of the porous polypropylene film can be decreased, and therefore, the performance of the battery can be sufficiently secured.

The properties of the porous polypropylene film of the present invention can be freely regulated according to the layer constitution, the lamination ratio, the compositions of the respective layers, and the production method.

In regard to the porous polypropylene film of the present invention, the porosity is preferably 30% or greater, more preferably 35% or greater, and even more preferably 40% or greater. When the porosity is 30% or greater, a porous polypropylene film which has secured pore connectivity and excellent air permeability properties can be obtained.

On the other hand, the upper limit is preferably 70% or less, more preferably 65% or less, and even more preferably 60% or less. When the porosity is 70% or less, a decrease in the film strength due to an excessive increase in fine pores does not easily occur, and it is also preferable in view of handling. The porosity is measured by the method described in Examples.

In regard to the porous polypropylene film of the present invention, it is important that the tensile strength in the machine direction (MD) of the film, $E_{MD}$, is 100 MPa or greater, and the tensile strength $E_{MD}$ is preferably 120 MPa or greater, and more preferably 140 MPa or greater. When the tensile strength $E_{MD}$ is 100 MPa or greater, since the tensile strength $E_{MD}$ is sufficiently high, handleability of the film is excellent. On the other hand, there are no particular limitations on the upper limit, but in view of the relationship of the balance with other properties, the tensile strength $E_{MD}$ is preferably 1000 MPa or less.

It is important that the tensile strength in the transverse direction to the machine direction (TD), $E_{TD}$, is less than 100 MPa, and the tensile strength $E_{TD}$ is preferably 80 MPa or less, and more preferably 60 MPa or less. When the tensile strength $E_{TD}$ is less than 100 MPa, a porous structure which is adequate for having pore connectivity can be easily formed, and the resulting film has excellent air permeability properties, which is preferable. On the other hand, there are no particular limitations on the lower limit, but in view of the relationship of the balance with other properties, the tensile strength $E_{TD}$ is preferably 1 MPa or greater, and more preferably 10 MPa or greater.

Furthermore, it is important that the ratio of $E_{MD}$ and $E_{TD}$, $E_{MD}/E_{TD}$, is 1.5 or greater, and the ratio $E_{MD}/E_{TD}$ is preferably 1.7 or greater, and more preferably 2.0 or greater. On the other hand, it is important that the upper limit of the ratio of $E_{MD}$ and $E_{TD}$, $E_{MD}/E_{TD}$, is 10 or less, and the upper limit is preferably 8.0 or less, and more preferably 6.0 or less. When the ratio of $E_{MD}$ and $E_{TD}$, $E_{MD}/E_{TD}$, is adjusted to fall in the defined range, a porous structure having pore connectivity can be formed. Therefore, a porous polypropylene film which can exhibit excellent air permeability properties even though the film does not have a very high porosity, and also has excellent puncture strength and tensile strength due to having a low porosity, can be obtained.

It is important that the air permeability of the porous polypropylene film of the present invention is 700 seconds/100 ml or less, and the air permeability is more preferably 50 to 600 seconds/100 ml, and even more preferably 100 to 500 seconds/100 ml. When the air permeability is 700 seconds/100 ml or less, it is preferable because it shows that the porous polypropylene film has pore connectivity, and excellent air permeability properties can be exhibited.

Air permeability represents how difficult it is for air to escape in the film thickness direction, and specifically, air permeability is expressed in the number of seconds required for 100 ml of air to pass through the film. Accordingly, a smaller value means that air can easily escape, while a larger value means that it is difficult for air to escape. That is, a smaller value of the air permeability means that the pore connectivity of the film in the thickness direction is good, and a larger value means that the pore connectivity of the film in the thickness direction is poor (this is also described that bending ratio is increased). The pore connectivity is the extent of connection between pores in the film thickness direction. When the air permeability of the porous polypropylene film of the present invention is low, the porous polypropylene film can be used in various applications.

In regard to the puncture strength of the porous polypropylene film of the present invention, it is important that the value is 1.5 N or greater, regardless of the thickness, preferably 2.0 N or greater, and more preferably 3.0 N or greater.

The method for measuring the puncture strength will be described below, but if the puncture strength is lower than 1.5 N, it is not preferable because the mechanical strength in the planar direction of the film is insufficient, and the film is prone to breakage. For example, when the porous polypropylene film is used as a separator for batteries, the probability of occurrence of short circuit due to destruction of the separator by foreign materials at the time of battery production is increased, and therefore, it is not preferable.

According to the present invention, the ratio of the value of the air permeability and the value of the puncture strength is preferably 150 or less, more preferably 130 or less, and even more preferably 100 or less. The most important feature of the film of the present invention is that the porous polypropylene film has both air permeability properties and strength. This is because when a porous structure having high pore connectivity is formed, the porous polypropylene film can achieve a good balance between exhibiting excellent air permeability properties even at a relatively low porosity, and having a high strength as well due to low porosity. When the ratio of the value of air permeability and the value of puncture strength is 150 or less, it is preferable because the porous polypropylene film can achieve a good balance between sufficient air permeability properties and excellent strength.

On the other hand, there are no particular limitations on the lower limit, the ratio is more preferably 10 or greater. When the ratio is 10 or greater, it is preferable because the polypropylene film can achieve a good balance between sufficient air permeability properties and excellent strength.

A feature of the present invention may be that the porous polypropylene film has appropriate sliding properties and has excellent handleability.

In regard to the porous polypropylene film of the present invention, the range of the coefficient of dynamic friction at the front and back surfaces of the film is preferably 0.10 to 0.80, more preferably 0.20 to 0.70, and even more preferably 0.30 to 0.60. If the coefficient of dynamic friction is less than 0.10, because the surfaces become too slippery, when the porous polypropylene film is wound, a winding displacement is prone to occur, which is not preferable. On the other hand, if the coefficient of dynamic friction exceeds 0.80, handleability of the film is decreased, and for example, during the conveyance/winding process, wrinkling or the like is prone to occur, which is not preferable. A technique for controlling the coefficient of dynamic coefficient at the front and back surfaces of the film in the range described above, may involve lowering of the stretch ratio in the transverse direction.

[Description on Method for Producing Porous Polypropylene Film]

Next, the method for producing a porous polypropylene film of the present invention will be described, but the present invention is not intended to be limited only to the porous polypropylene film produced by such a production method.

The method for producing a poreless film-like object is not particularly limited, and any known method may be used. However, an example may be a method of melting a thermoplastic resin composition using an extruder, extruding the thermoplastic resin composition through a T-die, and cooling and solidifying the thermoplastic resin composition using a cast roll. A method of opening up a film-like object produced by a tubular method, and making the film-like object into a planar form can also be applied.

Examples of the method of stretching a poreless film-like object include techniques such as a roll stretching method, a rolling method, a tenter stretching method, and a simultaneous biaxial stretching method. Uniaxial stretching or biaxial stretching is carried out by using these methods singly or a combination of two or more method. Among them, sequential biaxial stretching is preferred from the viewpoint of controlling the porous structure.

According to the present invention, when a laminated porous polypropylene film is produced, the production method is roughly classified into the following two classes on the basis of the order of porosification and lamination.

(a) A method of porosifying various layers, and then laminating the respective porosified layers by stacking the layers or adhering the layers with an adhesive.

(b) A method of producing a laminated poreless film-like object by laminating the respective layers, and then porosifying the resulting poreless film-like object.

(c) A method of porosifying any one layer among the various layers, subsequently laminating any one layer of a poreless film-like object thereon, and porosifying the laminate.

(d) A method of producing a porous layer, and then producing a laminated porous film by implementing coating application of inorganic/organic particles or deposition of metal particles.

According to the present invention, from the viewpoints of simplicity of the process and productivity, it is preferable to use the method (b), and among others, a method of producing a laminated poreless film-like object by co-extrusion, and then porosifying the film-like object is particularly preferable, in order to secure the interlayer adhesiveness of two layers.

Hereinafter, the details of the production method will be described.

First, a mixed resin composition of a polypropylene series resin, and if necessary, a thermoplastic resin and additives is produced. For example, raw materials such as a polypropylene series resin (A), a β crystal nucleating agent, and other additives as desired are mixed, preferably using a Henschel mixer, a super mixer, a tumbler type mixer or the like, or by introducing all the components in a bag and mixing with a hand blender. Subsequently, the mixture is melt kneaded with a single-screw or twin-screw extruder, a kneader or the like, and preferably with a twin-screw extruder, and then the product is cut to obtain pellets.

The pellets described above are fed into an extruder, and are extruded through a base for T-die extrusion. Thereby, a film-like object is molded. There are no particular limitations on the type of the T-die. For example, when the porous polypropylene film of the present invention has a two-kind three-layer laminated structure, the T-die may be a multi-manifold type for two-kind three-layer structure, or may be a feed block type for two-kind three-layer structure.

The gap of the T-die used is determined based on the thickness of the film that is finally required, the stretching conditions, the draft ratio, and various conditions, but the gap is generally about 0.1 to 3.0 mm, and preferably 0.5 to 1.0 mm. If the gap is smaller than 0.1 mm, it is not preferable in view of the production rate, and if the gap is larger than 3.0 mm, the draft ratio is increased, and it is not preferable in view of production stability.

In regard to extrusion molding, the extrusion processing temperature is appropriately adjusted based on the fluid properties or moldability of the resin composition, and the like. However, the extrusion processing temperature is generally preferably 180° C. to 350° C., more preferably 200° C. to 330° C., and even more preferably 220° C. to 300° C. When the extrusion processing temperature is adjusted to 180° C. or higher, the viscosity of the molten resin is sufficiently low, moldability is excellent, and productivity is enhanced, which is preferable. On the other hand, when the extrusion processing temperature is adjusted to 350° C. or lower, deterioration of the resin composition and a decrease in the mechanical strength of the porous polypropylene film thus obtained can be suppressed.

The cooling solidification temperature achieved using a cast roll is very important in the present invention, and the proportion of β crystals of the polypropylene series resin in the film-like object can be regulated. The cooling solidification temperature of the cast roll is preferably 80° C. to 150° C., more preferably 90° C. to 140° C., and even more preferably 100 to 130° C. When the cooling solidification temperature is adjusted to 80° C. or higher, it is preferable because the proportion of the β crystals in the film-like object can be sufficiently increased. Furthermore, when the cooling solidification temperature is adjusted to 150° C. or lower, problems such as that the molten resin adheres to and is wound up around the cast roll does not easily occur, and the formation of a film-like object can be efficiently achieved, which is preferable.

It is preferable to adjust the proportion of β crystals in the polypropylene series resin in the film-like object before stretching to 30% to 100% by setting the temperature of the cast roll to the range described above. The proportion of β crystals is more preferably 40% to 100%, even more preferably 50% to 100%, and most preferably 60% to 100%. When the proportion of β crystals in the film-like object before stretching is adjusted to 30% or greater, a porous polypropylene film which can be easily porosified by the subsequent stretching operation, and has satisfactory air permeability properties can be obtained.

The proportion of β crystals in the film-like object before stretching is calculated based on the following formula, using the heat of crystal melting originating from α crystals (ΔHmα) and the heat of crystal melting originating from β crystals (ΔHmβ) of the polypropylene series resin (A), which are detected when the film-like object is heated from 25° C. to 240° C. at a heating rate of 10° C./min using a differential scanning calorimeter.

$$\text{Proportion of β crystals(\%)} = [\Delta Hm\beta/(\Delta Hm\beta + \Delta Hm\alpha)] \times 100$$

Subsequently, it is more preferable to perform at least biaxial stretching of the poreless film-like object thus obtained. The biaxial stretching may be simultaneous biaxial stretching, or may be sequential biaxial stretching; however, sequential biaxial stretching by which the stretching conditions (ratio and temperature) can be conveniently selected during the respective stretching processes, and the porous structure can be easily controlled, is more preferred. Here, the machine direction of the film-like object and the film is referred to as the "longitudinal direction," and the transverse direction to the machine direction is referred to as the "transverse direction". Furthermore, the stretching in the pull (machine) direction is referred to as "longitudinal stretching," and the stretching in the transverse direction to the machine direction is referred to as "transverse stretching".

In the case of using sequential biaxial stretching, it is necessary to appropriately select the stretching temperature depending on the composition of the resin composition used, and the state of crystallization. However, it is preferable to select the stretching temperature in the range of the following conditions.

The stretching temperature in the longitudinal stretching is generally controlled in the range of 10° C. to 120° C., preferably 40° C. to 120° C., and more preferably 70° C. to 110° C. When the stretching temperature in the longitudinal stretching is 10° C. or higher, rupture during stretching is suppressed so that it is preferable for performing uniform stretching. On the other hand, when the stretching temperature in the longitudinal stretching is 120° C. or lower, appropriate pore formation can be achieved.

Furthermore, the stretching temperature in the transverse stretching is generally 90° C. to 160° C., preferably 100° C. to 150° C., and more preferably 110° C. to 140° C. When the stretching temperature in the transverse stretching is 90° C. or higher, rupture during stretching is suppressed, and it is preferable for performing uniform stretching. On the other hand, when the stretching temperature in the transverse stretching is 160° C. or lower, reduction in pores due to the fusion of polypropylene does not easily occur, and pores are appropriately opened so that satisfactory air permeability properties can be obtained.

The stretch ratios in the longitudinal direction and the transverse direction, and the ratio of the stretch ratios are very important in the present invention. While conventional porous films using β crystals is subjected to isotropic, high-ratio stretching, the porous film according to the present invention is subjected stretching at anisotropic stretch ratios in the longitudinal direction and the transverse direction (the stretch ratio in the longitudinal direction is set to be relatively higher than the stretch ratio in the transverse direction). Therefore, a porous film which exhibits a characteristic that the tensile strength in the longitudinal direction is higher, despite a high porosity, and which is well balanced between the air permeability properties and the puncture strength as compared with the conventional porous films that are isotropically stretched at high ratios, can be produced.

When the stretch ratio in the transverse direction, $\lambda_{TD}$, is made high, the air permeability properties are decreased, and the balance between the air permeability properties and the puncture strength is deteriorated. The reason for this is speculated to be that when the pores generated by longitudinal stretching in the first stage are flattened by high ratio stretching in the transverse direction, the bending ratio is increased, and as a result, the air permeability properties are decreased. The film produced by the production method of the present invention acquires an appropriate porosity and is balanced between the air permeability properties and the puncture strength, since the film is conditioned by low ratio stretching so as to prevent a reduction in the continuous pores as far as possible.

The stretch ratio in the longitudinal direction, $\lambda_{MD}$, is preferably 3.0 times or more, more preferably 3.5 times or more, and even more preferably 4.0 times or more. The upper limit is preferably 8.0 times or less, more preferably 7.5 times or less, and even more preferably 7.0 times or less. On the other hand, the stretch ratio in the transverse direction, $\lambda_{TD}$, is preferably 1.1 to 3.0 times, more preferably 1.1 to 2.6 times, even more preferably 1.1 to 2.4 times, and most preferably 1.1 to 2.0 times.

Furthermore, the ratio between the stretch ratios $\lambda_{MD}$ and $\lambda_{TD}$, $\lambda_{MD}/\lambda_{TD}$, is preferably 1.5 or greater, more preferably 1.8 or greater, and even more preferably 2.1 or greater. On the other hand, the upper limit is preferably 5.0 or less, more preferably 4.5 or less, and even more preferably 4.0 or less.

When biaxial stretching is carried out in the ranges described above, the origins of pores formed by longitudinal stretch are appropriately extended, and thereby a structure with fine pores can be realized. Thus, a porous polypropylene film having excellent air permeability properties can be obtained. Furthermore, a porous polypropylene film having an excellent tensile strength in the MD can be obtained.

The rate of stretch for the stretching process is preferably 500% to 12,000%/min, more preferably 1,500% to 10,000%/min, and even more preferably 2,500% to 8,000%/min. When the rate of stretch is in the range described above, the porous polypropylene film of the present invention can be efficiently produced.

The porous polypropylene film thus obtained is preferably subjected to a heat treatment for the purpose of improving the dimensional stability. At this time, if the temperature is set to preferably 100° C. or higher, more preferably 120° C. or higher, and even more preferably 140° C. or higher, it can be expected to obtain the effect of dimensional stability. On the other hand, the heat treatment temperature is preferably 170° C. or lower, more preferably 165° C. or lower, and even more preferably 160° C. or lower. When the heat treatment temperature is 170° C. or lower, fusion of polypropylene due to the heat treatment does not easily occur, and a porous structure can be maintained, which is preferable. Furthermore, during the heat treatment process, the porous polypropylene film may also be subjected to a relaxation treatment of 1% to 20% as necessary. After the heat treatment, the resultant film is uniformly cooled and wound, and thus the porous polypropylene film of the present invention is obtained.

EXAMPLES

Hereinafter, the porous polypropylene film of the present invention will be described in more detail by way of Examples and Comparative Examples, but the present invention is not intended to be limited thereto.

In addition, the machine direction of the porous polypropylene film is referred to as the "longitudinal direction," and the transverse direction to the machine direction is referred to as the "transverse direction".

The porous polypropylene film thus obtained was subjected to various analyses of properties and evaluations as follows. The results are summarized in Table 2.

(1) Thickness

The in-plane thickness was measured at ten arbitrarily selected sites using a 1/1000-mm dial gauge, and the average value was designated as the thickness.

(2) Porosity

The porosity is a value representing the proportion of void areas in the film. The porosity was determined by measuring the actual weight W1 of the film, calculating the mass in the case of a porosity of 0%, W0, from the density and thickness of the resin composition, and calculating the porosity from those values based on the following formula.

$$\text{Porosity}(\%) = \{(W0-W1)/W0\} \times 100$$

(3) Tensile Strength in MD, $E_{MD}$

The tensile strength of the film in the longitudinal direction was measured according to JIS K7127 under the conditions of a temperature of 23° C. and a test rate of 200 mm/min. A tensile strength in the MD, $E_{MD}$, of 100 MPa or greater was evaluated as "○", and a tensile strength of less than 100 MPa was evaluated as "x".

(4) Tensile Strength in TD, $E_{TD}$

The tensile strength of the film in the transverse direction was measured according to JIS K7127 under the conditions of a temperature of 23° C. and a test rate of 200 mm/min. A tensile strength in the TD, $E_{TD}$, of less than 100 MPa was evaluated as "○", and a tensile strength of 100 MPa or greater was evaluated as "x".

(5) Ratio $E_{MD}/E_{TD}$ Between Tensile Strength in MD, $E_{MD}$, and Tensile Strength in TD, $E_{TD}$ The ratio, $E_{MD}/E_{TD}$, between the tensile strength in the MD, $E_{MD}$, and the tensile strength in the TD, $E_{TD}$, was calculated from the values obtained by the measurements in the sections (3) and (4). An $E_{MD}/E_{TD}$ value of 1.5 to 10 was evaluated as "○", and an $E_{MD}/E_{TD}$ value out of the range of 1.5 to 10 was evaluated as "x".

(6) Air Permeability (Gurley Value)

The air permeability (seconds/100 ml) was measured according to JIS P8117. An air permeability of 700 seconds/100 ml or less was evaluated as "○", and an air permeability of greater than 700 seconds/100 ml was evaluated as "x".

(7) Puncture Strength

The puncture strength was measured according to the Japanese Agricultural Standard No. 1019, under the conditions of a pin diameter of 1.0 mm, a tip radius 0.5R, and a speed of pin puncture of 300 mm/min. A puncture strength of 1.5 N or greater was evaluated as "○", and a puncture strength of less than 1.5 N was evaluated as "x".

(8) Ratio of Value of Air Permeability and Value of Puncture Strength (Air Permeability/Puncture Strength)

The ratio of the value of air permeability and the value of puncture strength was calculated from the air permeability and the puncture strength obtained by the measurements in the sections (6) and (7). A ratio between the value of air permeability and the value of puncture strength, having a value of 150 or less was evaluated as "○", and a ratio having a value of greater than 150 was evaluated as "x".

(9) Coefficient of Dynamic Friction

The coefficient of dynamic friction at the front and back surfaces of the film was measured in the longitudinal direction according to JIS K7125. A coefficient of dynamic friction of 0.10 to 0.80 was evaluated as "○", and a coefficient of dynamic friction out of the range of 0.10 to 0.80 was evaluated as "x".

Furthermore, the porous polypropylene film thus obtained was subjected to an evaluation of the β activity as follows.

(10) Differential Scanning Calorimetric Analysis (DSC)

The film was heated from 25° C. to 240° C. at a heating rate of 10° C./min, maintained for one minute, subsequently cooled from 240° C. to 25° C. at a cooling rate of 10° C./min, maintained for one minute, and then reheated from 25° C. to 240° C. at a heating rate of 10° C./min, using a differential scanning calorimeter (DSC-7) manufactured by Perkin Elmer, Inc. The presence or absence of β activity was evaluated in the following manner, on the basis of whether a peak is detected at 145° C. to 160° C., which is a crystal melting peak temperature originating from the β crystals (Tmβ) of polypropylene, during the reheating.

○: Tmβ is detected in the range of 145° C. to 160° C. (having β activity)

x: Tmβ is not detected in the range of 145° C. to 160° C. (no β activity).

Furthermore, the measurement of the β activity was carried out with a sample amount of 10 mg and in a nitrogen atmosphere.

(11) Wide Angle X-Ray Diffraction Analysis (XRD)

The film was cut to a square having a size of 60 mm in length×60 mm in width, and the cut separator was interposed between a Teflon (registered trademark) membrane having a circular hole with a diameter of 40 mmφ at the center, and an aluminum plate. The assembly was fixed by clipping along the perimeter.

A film in a state of being confined between two sheets of aluminum plates was placed in a forced convection constant temperature oven (DKN602 type, manufactured by Yamato Scientific Co., Ltd.) at a set temperature of 180° C. and a display temperature of 180° C. and was maintained for 3 minutes. Subsequently, the set temperature was changed to 100° C., and slow cooling was carried out to 100° C. over a time period of 10 minutes or longer. At the time point where the display temperature reached 100° C., the film was taken out and was cooled for 5 minutes while in the state of being confined between two sheets of aluminum plates in an atmosphere at 25° C. The film thus obtained was subjected to a wide angle X-ray diffraction analysis on the circular area with a diameter of 40 mmφ at the center, under the following measurement conditions.

Wide angle X-ray analyzer: Product No. XMP18A manufactured by MAC Science Corp.

X-ray source: CuKα ray, output power: 40 kV, 200 mA

Scanning method: 2θ/θ scan, 2θ range: 5° to 25°, scan interval: 0.05°, scan rate: 5°/min In the diffraction profile thus obtained, the presence or absence of β activity was evaluated in the following manner from the peak originating from the (300) plane of the β crystals of polypropylene.

○: A peak was detected in the range of 2θ=16.0° to 16.5° (having β activity)

x: No peak was detected in the range of 2θ=16.0° to 16.5° (no β activity)

Furthermore, when the film specimen could not be cut to a square having a size of 60 mm×60 mm, the specimen may be produced by preparing the film to fit into a circular hole having a diameter of 40 mmφ at the center.

Examples and Comparative Examples

Production of Mixed Pellet 100 parts by mass of a homopolypropylene manufactured by Prime Polymer Co., Ltd., "PRIME PPF300SV (trade name)" (MFR 3.0 g/10 min) was mixed with 0.2 parts by mass of 3,9-bis[4-(N-cyclohexylcarbamoyl)phenyl]-2,4,8,10-tetraoxaspiro[5.5]undecane, which is a β crystal nucleating agent, and then the mixture was hand blended. The mixture was fed to a twin-screw extruder (base diameter 40 mmφ, L/D=32) manufactured by Toshiba Machine Co., Ltd., and was melt mixed at a set temperature of 280° C. Subsequently, the mixture was extruded through a strand die, and then the strand was cooled and solidified in a water bath at 23° C. The strand was cut with a pelletizer, and thus a mixed pellet of a polypropylene series resin and a β crystal nucleating agent was produced. At this time, the resin temperature at the strand die exit was 282° C., and the water immersion time for the strand was 5 seconds.

The mixed pellet was heated from 25° C. to 240° C. at a heating rate of 10° C./min, maintained for one minute, subsequently cooled from 240° C. to 25° C. at a cooling rate of 10° C./min, maintained for one minute, and then reheated from 25° C. to 240° C. at a heating rate of 10° C./min, using a differential scanning calorimeter (DSC-7) manufactured by Perkin Elmer, Inc. During the reheating, a crystal melting peak temperature originating from β crystals (Tmβ) was detected at 154° C., and a crystal melting peak temperature originating from α crystals (Tmα) was detected at 168° C.

That is, the mixed pellet has the β activity, and the degree of β activity calculated from the following formula was 80%.

$$\text{Degree of } \beta \text{ activity}(\%) = [\Delta Hm\beta/(\Delta Hm\beta + \Delta Hm\alpha)] \times 100$$

ΔHmβ: Heat of crystal melting originating from β crystals detected in the range of equal to or higher than 145° C. and lower than 160° C.

ΔHmα: Heat of crystal melting originating from α crystals detected in the range of equal to or higher than 160° C. and equal to or lower than 175° C.

<Production of Film>

The mixed pellet was melt mixed at 200° C. using a single-screw extruder (base diameter 40 mmφ, L/D=32) manufactured by Mitsubishi Heavy Industries, Ltd., and then was extruded through a T-die (rip gap 1 mm). A molten resin sheet thus obtained was pulled with a cast roll having a surface temperature of 123° C., and was cooled and solidified. Thus, a film-like object was obtained. At this time, the contact time for the molten resin sheet and the cast roll was 15 seconds.

Subsequently, the film-like object thus obtained was stretched in the longitudinal direction using a roll type longitudinal stretching machine by passing between rolls at the stretching temperature and ratio indicated in Table 1. Subsequently, the film-like object was stretched in the transverse direction using a film tenter-streaching instrument manufactured by Kyoto Machinery Co., Ltd., at the stretching temperature and ratio indicated in Table 1. The resultant film was subjected to heat fixing at 155° C. and then to relaxation of 5% at 145° C., and was cooled to room temperature. Thus, a porous polypropylene film was obtained. The property values of the film thus obtained are summarized in Table 1.

TABLE 1a

| Item | | Example 1 | Example 2 | Example 3 | Example 4 | Example 5 |
|---|---|---|---|---|---|---|
| MD stretch ratio $\lambda_{MD}$ | Times | 5.0 | 7.0 | 4.5 | 4.0 | 3.0 |
| MD stretching temperature | °C. | 110 | 100 | 90 | 90 | 85 |
| TD stretch ratio $\lambda_{TD}$ | Times | 2.5 | 2.0 | 1.5 | 1.8 | 2.0 |
| TD stretching temperature | °C. | 120 | 140 | 110 | 120 | 120 |
| $\lambda_{MD}/\lambda_{TD}$ | — | 2.0 | 3.5 | 3.0 | 2.2 | 1.5 |
| Thickness | | 25 | 25 | 25 | 26 | 24 |
| Porosity | % | 52 | 50 | 49 | 45 | 41 |
| MD tensile strength $E_{MD}$ | Mpa | ○ 150 | ○ 180 | ○ 155 | ○ 134 | ○ 112 |
| TD tensile strength $E_{TD}$ | MPa | ○ 45 | ○ 30 | ○ 35 | ○ 50 | ○ 56 |
| $E_{MD}/E_{TD}$ | — | ○ 3.4 | ○ 6.0 | ○ 4.4 | ○ 2.7 | ○ 2.0 |
| Air permeability | Sec/100 ml | ○ 300 | ○ 290 | ○ 340 | ○ 305 | ○ 490 |
| Puncture strength | N | ○ 3.8 | ○ 3.3 | ○ 3.9 | ○ 3.6 | ○ 3.8 |
| Air permeability/puncture strength | — | ○ 79 | ○ 88 | ○ 87 | ○ 85 | ○ 129 |
| Coefficient of dynamic friction | — | ○ 0.62 | ○ 0.65 | ○ 0.55 | ○ 0.62 | ○ 0.52 |
| DSC | — | ○ | ○ | ○ | ○ | ○ |
| XRD | — | ○ | ○ | ○ | ○ | ○ |

TABLE 1b

| Item | | Example 6 | Example 7 | Comparative Example 1 | Comparative Example 2 |
|---|---|---|---|---|---|
| MD stretch ratio $\lambda_{MD}$ | Times | 5.0 | 4.5 | 4.5 | 3.0 |
| MD stretching temperature | °C. | 100 | 100 | 90 | 110 |
| TD stretch ratio $\lambda_{TD}$ | Times | 2.3 | 2.1 | 5.0 | 6.0 |
| TD stretching temperature | °C. | 140 | 150 | 120 | 120 |
| $\lambda_{MD}/\lambda_{TD}$ | — | 2.2 | 1.5 | 0.9 | 0.5 |
| Thickness | | 25 | 24 | 25 | 25 |
| Porosity | % | 52 | 47 | 54 | 45 |
| MD tensile strength $E_{MD}$ | MPa | ○ 154 | ○ 143 | ○ 130 | ○ 80 |
| TD tensile strength $E_{TD}$ | MPa | ○ 46 | ○ 42 | ○ 120 | ○ 210 |
| $E_{MD}/E_{MD}$ | — | ○ 3.3 | ○ 3.4 | ○ 1.1 | ○ 0.4 |
| Air permeability | Sec/100 ml | ○ 250 | ○ 314 | ○ 750 | ○ 1270 |
| Puncture strength | N | ○ 4.1 | ○ 3.8 | ○ 3.7 | ○ 4.2 |
| Air permeability/puncture strength | — | ○ 61 | ○ 83 | ○ 203 | ○ 302 |
| Coefficient of dynamic friction | — | ○ 0.61 | ○ 0.56 | ○ 0.82 | ○ 0.83 |
| DSC | — | ○ | ○ | ○ | ○ |
| XRD | — | ○ | ○ | ○ | ○ |

It can be seen from Table 1 that the Examples having a constitution in the scope as defined in the present invention are porous polypropylene films having both air permeability properties and puncture strength. Also, despite having high air permeability properties, the porous polypropylene films have high tensile strengths in the MD, low coefficients of dynamic friction, and excellent sliding properties, and therefore, it is suggested that the films have satisfactory handleability. On the other hand, the Comparative Examples have significantly inferior air permeability properties as compared with the Examples, and higher coefficients of dynamic friction. Particularly, the tensile strength in the MD, $E_{MD}$, is low in Comparative Example 2. Thus, it is suggested that the films do not have satisfactory handleability.

INDUSTRIAL APPLICABILITY

The porous polypropylene film of the present invention can be applied to various applications where air permeability is required. The porous polypropylene film of the present invention can be very suitably used as a separator for lithium batteries; a sanitary material for pads for body fluid absorption, such as disposable diapers and sanitary products, or bedsheets; a medical material for surgical gowns or hot compresses; a clothing material for jackets, sportswear or raincoats; a construction material such as wallpaper, a roof waterproofing material, an insulating material, and a soundproofing material; a desiccant; a moisture-proofing agent; a deoxidizing agent; a disposable pocket body warmer; or a packaging material for fresh keeping packaging or food packaging.

The invention claimed is:

1. A porous polypropylene film having a tensile strength in the flow direction of the film, $E_{MD}$, of 100 MPa or greater; a tensile strength in the direction perpendicular to the flow direction, $E_{TD}$, of less than 100 MPa; a ratio of $E_{MD}$ and $E_{TD}$, $E_{MD}/E_{TD}$, of 1.5 to 10; an air permeability of 700 seconds/100 ml or less; a puncture strength of 1.5 N or greater; and having β activity wherein the porous polypropylene film is obtained under the following stretching conditions of a TD stretching temperature of from 100-160° C., and a MD stretching temperature of from 10 to 120° C. such that a stretch ratio in the flow direction of the film, $\lambda_{MD}$, is 3.0 to 8.0 times; a stretch ratio in the direction perpendicular to the flow direction, $\lambda_{TD}$, is 1.1 to 2.5 times; and a ratio between $\lambda_{MD}$ and $\lambda_{TD}$, $\lambda_{MD}/\lambda_{TD}$, is 1.5 to 5.0.

2. The film of claim 1, wherein a coefficient of dynamic friction at the front and back surfaces of the film is 0.10 to 0.80.

3. The film of claim 2, wherein the porous polypropylene film is obtained under the following stretching conditions of a TD stretching temperature of from 100-160° C., and a MD stretching temperature of from 10 to 120° C. such that a stretch ratio in the flow direction of the film, $\lambda_{MD}$, is 3.0 to 8.0 times; a stretch ratio in the direction perpendicular to the flow direction, $\lambda_{TD}$, is 1.1 to 2.5 times; and a ratio between $\lambda_{MD}$ and $\lambda_{TD}$, $\lambda_{MD}/\lambda_{TD}$, is 1.5 to 5.0.

4. The film of claim 1, wherein the porous propylene film comprises a polypropylene resin comprising a β crystal nucleating agent.

5. The film of claim 4, wherein the β crystal nucleating agent is contained in an amount of 0.0001 to 5.0 parts by mass relative to 100 parts by mass of the polypropylene resin.

6. The film of claim 1, wherein the porous propylene film comprises a polypropylene resin having a isotactic pentad fraction of 80% to 99%.

7. The film of claim 1, wherein the porous propylene film comprises a polypropylene resin having a Mw/Mn ratio of from 2.0 to 10.0.

8. The film of claim 1, wherein the porous propylene film comprises a polypropylene resin having a melt flow rate of from 0.5 to 15 g/10 min.

9. The film of claim 4, wherein the thickness of the porous propylene film is from 1 to 500 μm.

10. The film of claim 1, wherein the porous propylene film has a porosity of from 30% to 70%.

11. The film of claim 1, wherein the porous propylene film has a puncture strength of 3.0 N or greater.

* * * * *